No. 862,126. PATENTED AUG. 6, 1907.
E. C. ASZMAN.
CALIPERING MACHINE.
APPLICATION FILED JULY 2, 1906.
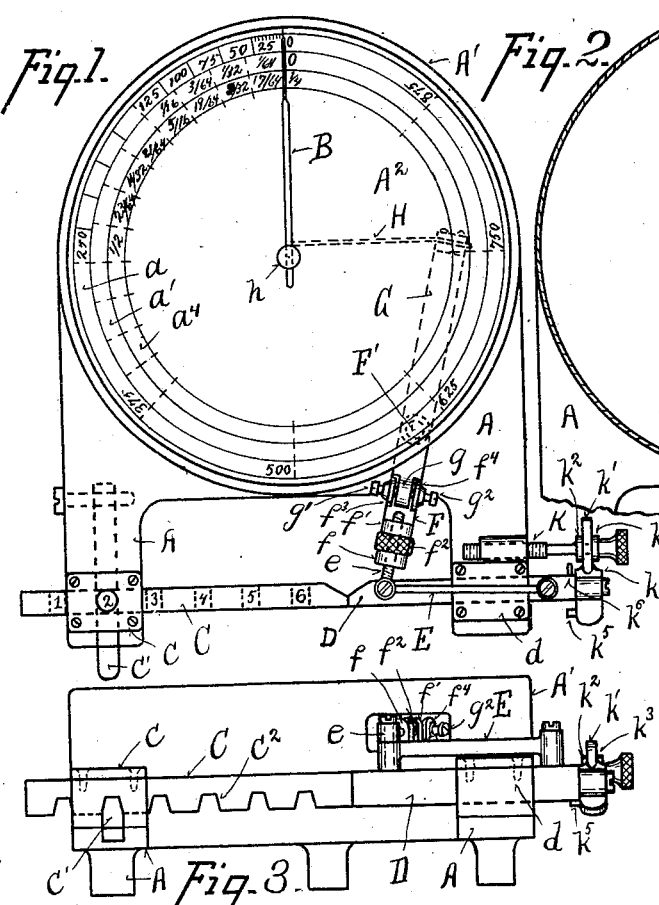
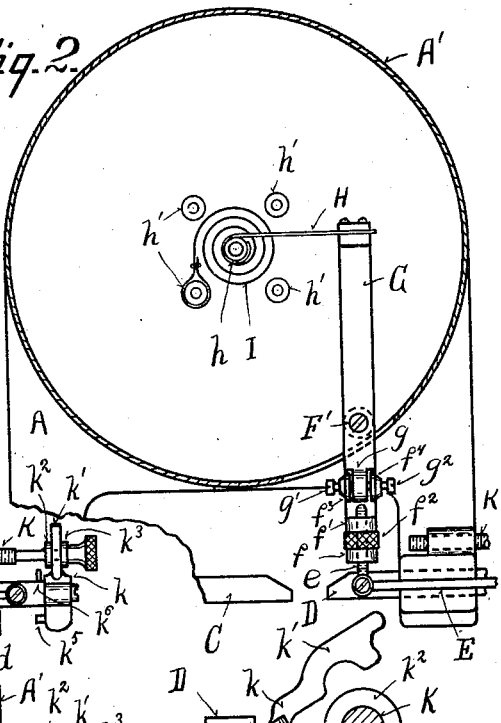
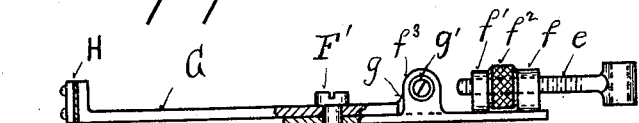
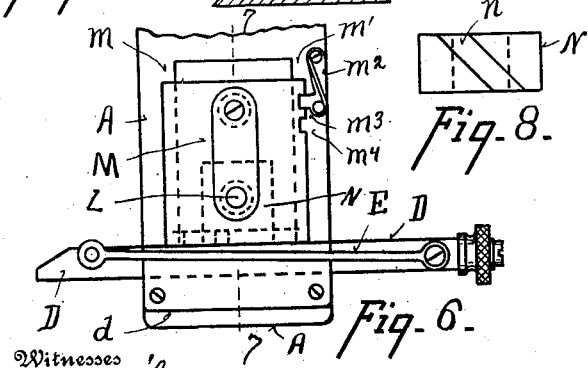
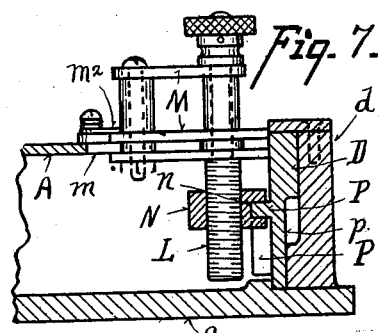
Inventor
Edward C. Aszman
By Walter F. Murray
Attorney
Witnesses
C. W. Mills
A. McCormack

UNITED STATES PATENT OFFICE.

EDWARD C. ASZMAN, OF CINCINNATI, OHIO, ASSIGNOR TO WILLIAM A. WINTER, OF CINCINNATI, OHIO.

CALIPERING-MACHINE.

No. 862,126.  Specification of Letters Patent.  Patented Aug. 6, 1907.

Application filed July 2, 1906. Serial No. 324,301.

*To all whom it may concern:*

Be it known that I, EDWARD C. ASZMAN, a citizen of the United States of America, and a resident of Cincinnati, county of Hamilton, State of Ohio, have invented certain new and useful Improvements in Calipering-Machines, of which the following is a specification.

My invention relates to improved calipering mechanism. One of its objects is to provide an improved mechanism whereby the dimensions of machine parts or other articles may be quickly and accurately obtained, and on a magnified scale.

Another object is to provide means for accurately adjusting the parts when required to compensate for wear or other causes affecting the accuracy of the mechanism.

Another object is to provide means whereby the calipers may be used with or without the micrometer screw as desired, and may be conveniently and quickly connected to or disconnected from such screw.

It further consists in certain details of form, combination and arrangement, all of which will be more fully set forth in the description of the accompanying drawings, in which, Figure 1 is a top plan view of my improved device. Fig. 2 is a similar view with the registering disk removed to show the operative parts beneath the same. Fig. 3 is a front elevation. Fig. 4 is a detail side elevation of the pivoted lever transmitting motion from the caliper jaws to the indicator. Fig. 5 is a detail of the connection between the movable caliper jaw and the micrometer screw. Fig. 6 is a top plan view of a modification of the mechanism connecting the caliper jaw with the micrometer screw. Fig. 7 is a section on line 7—7 of Fig. 6. Fig. 8 is a side elevation of the nut carried by the micrometer screw of Figs. 6 and 7. Fig. 9 is a detail view of a pair of caliper jaws for obtaining inside dimensions.

In the accompanying drawings, A, represents the frame, A′, a circular or cylindrical frame, in the upturned face of which is mounted a registering disk, $A^2$, inclosed by a glass protecting disk. The face of disk, $A^2$, is provided with one or more circular scales over which an indicator hand, B, travels. In Fig. 1 I have shown two scales, $a$, and, $a'$, one of which may be divided into thousands and the other into sixty-fourths, one complete revolution of the pointer indicating, say, one inch.

C, represents a rectangular caliper jaw mounted in a boxing, $c$, and adapted to slide endwise therein. The jaw, C, is held to its adjusted position by a spring actuated lever, $c'$, which is adapted to enter any one of the notches, $c^2$, in the bar, C, to lock the same in position. The notches are preferably spaced with their centers one inch apart. D, represents the opposite caliper jaw, which is mounted in a box, $d$, in which it is adapted to slide endwise, and is preferably limited to a movement of slightly over one inch, which is effected by suitable stops. Pivoted to the jaw, D, is an eyebar or link, E, the opposite end of which is pivotally connected to a screw threaded rod, $e$. The rod, $e$, passes through ears, $f, f'$, projecting from an arm or lever, F, which is pivoted at, F′, to the frame, A. A nut, $f^2$, located between the ears, $f, f'$, engages the threads of the rod, $e$. Also pivoted at, F′, is an arm or lever, G, which has at one end an ear, $g$, which enters loosely between the ears, $f^3, f^4$, of the arm, F. Adjusting screws, $g', g^2$, are threaded into the ears, $f^3, f^4$, and enable the ear, $g$, to be shifted nearer to or further from the ear, $f^3$, as desired. At the opposite end of arm, G, is attached one end of a steel tape, H, the opposite end of which is attached to the shaft, $h$, which carries pointer, B, and is journaled near opposite ends in a vertical position, the upper journal plate being located just beneath the registering disk, and held in place by studs, $h'$, attached to the frame, A. A coiled spring, I, attached at one end to the shaft, $h$, and at the opposite end to one of the studs, $h'$, tends to continuously hold the jaw, D, away from the jaw, C, by coiling the tape, H, upon the shaft, $h$, thereby drawing the inner end of arm, G, to which the tape is attached toward the shaft, $h$, and forcing the opposite end of arm, G, and with it arm, F, and rod, $e$, in the opposite direction, carrying with them the link, E, and jaw, D.

As shown in Figs. 1, 2, 3 and 5, the jaw, D, may be connected to, so as to be adjusted by turning, the micrometer screw, K, through an arm, $k$, pivotally connected to the outer end of jaw, D, the projecting end $k'$ of said arm, being adapted to fit into a groove or recess between the collars, $k^2, k^3$, on the shank of the micrometer screw. The arm, $k$, may also be readily shifted out of engagement with the micrometer screw, as indicated in Fig. 5. Stop pins, $k^5, k^6$, carried by jaw, D, and arm, $k$, serve to limit the movement of arm, $k$.

In the modification shown in Figs. 6, 7, and 8, the micrometer screw, L, is mounted vertically in a plate or frame, M, which slides horizontally on guides or ways, $m, m'$, on the frame, A, and is locked at either extremity of its movement by a spring pawl, $m^2$, engaging notches, $m^3, m^4$, in the edge of the frame, M. N, represents a nut which is caused by turning the screw, L, to travel vertically relative to the frame, M. Nut, N, is provided with a diagonal groove, $n$, which engages a corresponding rib, P, on an extension, $p$, attached to and traveling with the jaw, D. When the frame, M, is in position for the pawl, $m^2$, to engage the recess, $m^4$, the rib, P, is out of engagement with the groove in nut, N, and upon releasing the pawl, and pushing the frame, M, forward, the rib, P, may be engaged in the groove of the nut, N, by shifting the jaw, D, in its ways until the rib and groove register, when the pawl will enter notch, $m^3$, and lock the frame, M, to position, and by turning the screw, L, the nut, N, will travel vertically and by its engagement with rib, P, will feed the jaw, D, horizontally in either direction.

The operation is as follows: The pointer, B, may be adjusted to accurately point to zero when the jaw is fully retracted, or in its normal position by adjusting the screws, $g'$, $g^2$, then as the full movement of jaw, D, should be one inch or other standard of measurement, or slightly more than an inch if desired, the nut, $f^2$, is adjusted to shorten and lengthen the travel of arm, G, relative to the movements of jaw, D, until a point is reached at which one revolution of the pointer corresponds to exactly one inch movement of the jaw, D. Any object which it is desired to caliper may now be introduced between the ends of the jaws, C, D, adjusting the jaw, C, by means of the lever, C', is necessary to obtain a rough or approximate adjustment within one inch of the diameter to be measured. The jaw, D, may be pushed by hand or fed by the micrometer screw to the desired position, when the exact diameter will be indicated on the disk, $A^2$, by the pointer, B. As the distance traveled by the pointer over the scale is much greater in proportion than the movement of the caliper jaw, a very small fraction of an inch in the dimensions of the article being calipered is indicated by a considerable space on the scale, so as to be readily perceived.

When the jaws, Fig. 9 are employed for obtaining inside dimensions, the dimensions are read from a scale, $a^4$, instead of from the scales, $a$, $a'$.

The mechanism herein specified is capable of considerable modification without departing from the principle of my invention.

Having described my invention, what I claim is:

1. In a mechanism of the character indicated, a stationary caliper jaw, a movable caliper jaw, a scale, a pointer adapted to indicate on said scale the dimensions of the article to calipered, a two-part lever moving in unison with said movable caliper jaw to actuate said pointer, one member of said lever being adjustable lengthwise and the other member being adjustable laterally relative to said first named member.

2. In a mechanism of the character indicated, a stationary caliper jaw, a movable caliper jaw normally held in the retracted position, a scale, a pointer moving over said scale to indicate the dimensions of the article to be calipered, a pivoted arm or lever composed of two members, the first of said members having an extensibly adjustable arm at its free end, said arm being connected to said movable caliper jaw, the second member being pivoted concentrically with said first member and adjustably connected thereto and adapted by its movements to actuate the pointer.

3. In a mechanism of the character indicated a stationary caliper jaw, a movable caliper jaw, a scale, a pointer moving over said scale, a lever composed of two members, the free end of one of said members being connected by link mechanism to said movable jaw, and the second member adjustable laterally at one end relatively to said first named member and connected at the opposite end to said pointer for adjusting said pointer to the zero position on the scale when the movable jaw is in the retracted position.

4. In a mechanism of the character indicated, a stationary caliper jaw, a movable caliper jaw, a scale, a pointer adapted to indicate on said scale the dimensions of the article to be calipered, a pivoted lever having one end connected to said pointer and its opposite end extensibly adjustable and connected by link mechanism with said movable jaw to vary the throw of said pointer relative to the movement of said movable jaw.

5. In an article of the character indicated, a stationary frame, a scale, carried by said frame, a pointer adapted to indicate on said scale the dimensions of the article to be calipered, a pair of caliper jaws carried by said frame, one of said jaws being movable endwise in guides carried by said frame, mechanism connecting the pointer with said movable jaw, a screw adapted when turned to shift said movable jaw, and means for temporarily engaging said screw with said movable jaw.

6. In a mechanism of the character indicated, a frame, a caliper jaw stationarily locked to said frame, a movable caliper jaw mounted in ways on said frame and adapted to move endwise relative to said frame, a circular scale, a pivoted pointer adapted to indicate on said scale the dimensions of the article to be calipered, a pivoted lever connected at one end to said pointer by a metal tape partially encircling the stem of said pointer and at the opposite end to said movable caliper jaw.

In testimony whereof I hereunto affix my signature in the presence of two witnesses.

EDWARD C. ASZMAN.

Witnesses:
C. W. MILES,
A. McCORMACK.